Patented Mar. 14, 1939

2,150,601

UNITED STATES PATENT OFFICE 2,150,601

LONG CHAIN ALKYL QUATERNARY AMMONIUM FLUOSILICATES

Robert B. Flint, Wilmington, Del., assignor to E. I. du Pont de Nemours & Company, Wilmington, Del., a corporation of Delaware No Drawing. Application March 19, 1937, Serial No. 131,935

14 Claims. (Cl. 260—583)

This invention relates to quaternary ammonium fluosilicates containing a long chain alkyl radical, to methods for making the same, and to compositions containing the same, which compositions are useful in controlling or destroying lower forms of life, e. g., fungi, insects, bacteria, and the like.

This invention has as an object the preparation of long chain quaternary ammonium fluosilicates. A further object is the preparation of compositions toxic to lower forms of life, which compositions are adapted for use as fungicides, bactericides, and insecticides, particularly mothicides.

The above and other objects appearing hereinafter are accomplished by the following invention which comprises reacting hydrofluosilicic acid with a quaternary ammonium base having an alkyl radical of at least 8 and preferably 8 to 18 carbon atoms, and isolating the resulting quaternary ammonium fluosilicate. This product may then be used in pesticidal compositions.

I have found that long-chain quaternary ammonium hydroxides react readily with aqueous hydrofluosilicic acid to give useful new compounds, the majority of which may be represented by the formula

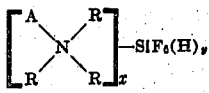

where $x$ is a positive integer less than 3, $y$ is less than 2, $x+y=2$, A is an alkyl radical of at least 8 carbons, and the various R's are hydrocarbon radicals, two of which may form an alkylene radical. In further explanation of this formula, it may be pointed out that $x$ may have a value of 1 or 2 and $y$ a value of 0 or 1. The formula thus includes fluosilicates having one or two quaternary ammonium radicals. The R's may be alkyl, aryl, aralkyl, or alicyclic, and may be the same or different.

Compounds represented by the above formula possess insecticidal action both as contact insecticides for sucking insects, and as stomach poisons for leaf-eating insects. They are also toxic to moths and, when used as mothicides, lend themselves readily to uniform incorporation with materials such as woolen articles simply by immersing the latter in an aqueous solution of the long-chain quaternary ammonium fluosilicate. The compounds of the above formula are also useful as germicides, fungicides, and bactericides.

The following examples, in which parts and percentages are by weight unless otherwise stated, illustrate the more detailed practice of the invention but are not to be construed as limitative.

EXAMPLE I

*Dodecyldimethylcyclohexylammonium fluosilicate—Neutral salt*

Eleven and eight-tenths (11.8) parts of n-dodecyldimethylcyclohexylammonium hydroxide in 60% aqueous solution was mixed at 20 to 25° C. with 5.3 parts of 30% aqueous hydrofluosilicic acid. Di-(n-dodecyldimethylcyclohexylammonium) fluosilicate of the formula

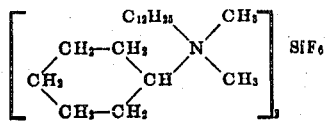

was formed spontaneously. The resulting aqueous solution, preferably diluted further, may be used as a mothicide in the manner already stated. The fluosilicate may be isolated if desired by evaporating off the water under a vacuum at 20–25° C.

EXAMPLE II

*Dodecyltrimethylammonium fluosilicate—Acid salt*

Nine and eight-tenths (9.8) parts of a 50% aqueous solution of n-dodecyltrimethylammonium hydroxide was added with stirring to 9.6 parts of 30% aqueous hydrofluosilicic acid at 10 to 15° C. Mono-(n-dodecyltrimethylammonium) fluosilicate of the formula

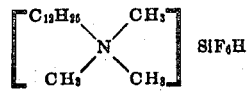

formed spontaneously and may be isolated if desired by evaporating off the water at 18–20° C. under a sufficient vacuum to permit steady boiling. The aqueous solution of the acid salt may be utilized directly as a fungicide, if desired, or it may for example be diluted to form a bath in which railroad ties can be immersed.

EXAMPLE III

*Octylpyridinium fluosilicate*

Nineteen (19) parts of a 22% aqueous solution of n-octylpyridinium hydroxide was added with agitation at 20 to 25° C. to 4.8 parts of a 30% aqueous hydrofluosilicic acid solution. Di-(n-octylpyridinium) fluosilicate of the formula

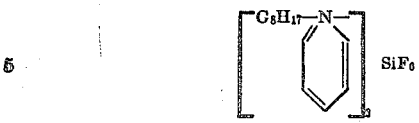

was formed simultaneously. The anhydrous salt may be obtained by removing the water from this solution in vacuo at 20° C. This compound may be used to control or exterminate black chrysanthemum aphids, flies, and moths.

EXAMPLE IV

*Octadecylbenzyldimethylammonium fluosilicate*

Twenty-four (24) parts of a 34% aqueous solution of n-octadecylbenzyldimethylammonium hydroxide was added slowly with stirring at 15 to 20° C. to 4.8 parts of a 30% aqueous solution of hydrofluosilicic acid. Di-(n-octadecylbenzyldimethylammonium) fluosilicate of the formula

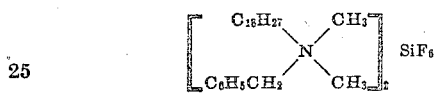

was formed spontaneously. This solution may be employed to disinfect kennels and quarters of domestic animals.

EXAMPLE V

*Dodecylphenyldimethylammonium fluosilicate*

Fourteen and seven-tenths (14.7) parts of a 42% aqueous solution of n-dodecylphenyldimethylammonium hydroxide was added with agitation at 20 to 25° C. to 4.8 parts of a 30% aqueous solution of hydrofluosilicic acid. The di-(n-dodecylphenyldimethylammonium) fluosilicate of the formula

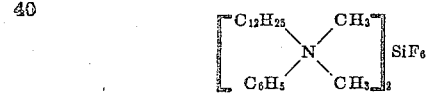

which was produced spontaneously was isolated by evaporating off the water in vacuo at 20 to 25° C. This compound is a good mothicide for woolen goods.

EXAMPLE VI

*Octadecyltrimethylammonium fluosilicate*

An approximately 14% aqueous solution of 3.45 parts of n-octadecyltrimethylammonium hydroxide was added at 20 to 25° C. to 5.04 parts of a 30% aqueous solution of hydrofluosilicic acid, the compound di-(n-octadecyltrimethylammonium) fluosilicate of the formula

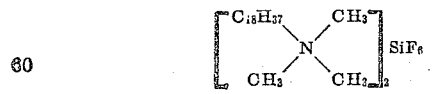

being formed spontaneously. The resulting mixture containing the precipitated salt was diluted with cold acetone, and the crystals were separated by filtration and washed with acetone. They were found on analysis to contain 14.2% fluorine, whereas the calculated amount for the compound of the above formula is 14.9%. The product, octadecyltrimethylammonium fluosilicate, is a white compound which melts at 263–268° C. with darkening. It is soluble in warm absolute alcohol, warm benzene, and in trichloroethylene. It is very slightly soluble, i. e., relatively insoluble in acetone, ethyl acetate, and petroleum ether. Materials such as furs may be protected effectively against the depredations of insects by means of this compound.

The long chain quaternary ammonium fluosilicates may also be prepared by the reaction of the quaternary ammonium bromide with hydrofluosilicic acid as illustrated in the following example.

EXAMPLE VII

*Octadecyltrimethylammonium fluosilicate*

To 15.68 parts of n-octadecyltrimethylammonium bromide dissolved in a warm mixture of 40 parts of methanol and 50 parts of acetone there was added with stirring 15 parts of 29% aqueous hydrofluosilicic acid. After the mixture had been allowed to stand for 2 hours, the crystalline precipitate was filtered, washed with acetone and dried. There was obtained 15 parts of n-octadecyltrimethylammonium fluosilicate.

The quaternary ammonium fluosilicates of the present invention, when pure, are white crystalline compounds.

The quaternary ammonium hydroxides used in the practice of the invention may be prepared by reacting quaternary ammonium halides with potassium or other alkali metal hydroxide in absolute alcohol and removing the precipitated salt by filtration.

In addition to the specific applications mentioned in the examples, the above quaternary ammonium fluosilicates may be incorporated in aqueous solution with a spreader such as fish oil soap and used as a plant spray which is toxic to insects, such as eastern tent caterpillar, codling moth, and oriental fruit moth.

These quaternary ammonium fluosilicates are easily incorporated into materials to be protected against insects by immersing the material such as a textile fabric in an aqueous solution of the fluosilicate. For example, the fabric may be immersed in a 1% aqueous solution of n-dodecyldimethylcyclohexylammonium fluosilicate and dried. Such materials as wool, fur, hair, hides, felts and the like may thus be impregnated and protected. The material after treatment is mothproofed without detriment to color or physical characteristics.

The invention is generic to preparation and use of quaternary ammonium fluosilicates, acid or neutral, having on the nitrogen atom an alkyl radical of at least eight and preferably eight to eighteen carbon atoms. The invention also contemplates compounds having one or more quaternary ammonium basic groupings in the same molecule. Thus, compounds having two tertiary nitrogens capable of forming quaternary ammonium bases, or two different compounds having nitrogen of this type, can be used as starting materials for the preparation of quaternary ammonium fluosilicates. The term quaternary ammonium base also includes compounds having other functional groups in the molecule, such as hydroxyl groups. Examples of specific quaternary ammonium bases suited for use in the invention are octyltrimethylammonium hydroxide, dioctylmethylethylammonium hydroxide, dodecylquinolinium hydroxide, dodecyl-beta-ethyloldimethylammonium hydroxide, dodecyltributylammonium hydroxide, dodecylsorbitylmethylammonium hydroxide, hexadecyltrimethylammonium hydroxide, octadecylpyridinium hydroxide, octadecylphenyldiethylammonium hydroxide, octadecenyltrimethylammonium hydroxide, and octadecyldimethylcyclopentylammonium hydroxide.

The examples disclose the preparation of salts by neutralization of hydrofluosilicic acid with the appropriate base. The salts may also be prepared by reacting quaternary ammonium halides with alkali metal fluosilicates.

As is evident from the above examples, the reaction between the long-chain quaternary ammonium base and the hydrofluosilicic acid generally takes place spontaneously in aqueous solution at approximately room temperature. Temperatures as low as the freezing point of the solutions employed may be used in many cases, but temperatures above about 30° C. are neither necessary or desirable since they often tend to decompose the quaternary ammonium hydroxides.

As already indicated, the aqueous solution of the reaction product, as obtained in the reaction, may be used directly against lower forms of life. That is, for insecticidal purposes, the long chain quaternary ammonium hydroxide and the hydrofluosilicic acid may be merely mixed in aqueous solution in the theoretical quantities, and then diluted and mixed with a suitable spreader. Any concentration which is not injurious to the host receiving the insecticidal mixture may be used.

The long-chain quaternary ammonium fluosilicates are easily prepared compounds which are in general soluble in water and practically odorless. They have the added advantage as insecticides in that they function both as contact insecticides and as stomach poisons. As mothproofing agents they may be readily applied in aqueous solution.

The above description and examples are intended to be illustrative only. Any modification of or variation therefrom which conforms to the spirit of the invention is intended to be included within the scope of the claims.

I claim:

1. A quaternary ammonium fluosilicate containing, on the nitrogen, an alkyl radical of at least eight carbon atoms the remaining radicals on the nitrogen being hydrocarbon radicals.

2. A quaternary ammonium fluosilicate containing, on the nitrogen, an alkyl radical of eight to eighteen carbon atoms the remaining radicals on the nitrogen being hydrocarbon radicals.

3. A quaternary dodecylammonium fluosilicate the remaining radicals on the nitrogen being hydrocarbon radicals.

4. n-Octadecyltrimethylammonium fluosilicate.

5. Method which comprises reacting hydrofluosilicic acid with a quaternary ammonium hydroxide containing on the nitrogen an alkyl radical of at least eight carbon atoms the remaining radicals on the nitrogen being hydrocarbon radicals.

6. Method which comprises reacting hydrofluosilicic acid with a quaternary ammonium hydroxide containing on the nitrogen an alkyl radical of eight to eighteen carbon atoms the remaining radicals on the nitrogen being hydrocarbon radicals.

7. Process which comprises reacting 3.45 parts of n-octadecyltrimethylammonium hydroxide, as a 14% aqueous solution with 5.04 parts of a 30% aqueous solution of hydrofluosilicic acid and removing the water from the n-octadecyltrimethylammonium fluosilicate by evaporation in vacuo at room temperature.

8. Process which comprises reacting aqueous hydrofluosilicic acid with a quaternary ammonium base having on the nitrogen an alkyl radical of at least eight carbon atoms the remaining radicals on the nitrogen being hydrocarbon radicals.

9. A quaternary ammonium fluosilicate having the formula

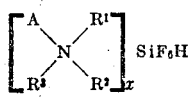

wherein $x$ is a positive integer less than 3, $y$ is less than 2, $x+y=2$, A is an alkyl radical of at least eight carbon atoms, $R^1$, $R^2$, and $R^3$ are hydrocarbon radicals, two of which form a divalent aliphatic hydrocarbon radical and form with the nitrogen a heterocyclic structure.

10. A quaternary ammonium fluosilicate according to claim 9, wherein A is an alkyl radical of eight to eighteen carbon atoms.

11. A quaternary ammonium fluosilicate according to claim 9 wherein A is an n-dodecyl radical.

12. Method which comprises reacting hydrofluosilicic acid with a quaternary ammonium hydroxide of the formula

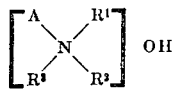

wherein A is an alkyl radical of at least eight carbon atoms, $R^1$, $R^2$, and $R^3$ are hydrocarbon radicals, two of which form a divalent aliphatic hydrocarbon radical and form with the nitrogen a heterocyclic structure.

13. Method of claim 12 wherein A is an alkyl radical of eight to eighteen carbon atoms.

14. Method of claim 12 wherein the hydrofluosilicic acid is in aqueous solution.

ROBERT B. FLINT.